April 6, 1965 C. G. ELLWANGER 3,176,586

MACHINE FOR CUTTING RACK TEETH OR THE LIKE

Filed Feb. 11, 1963 4 Sheets-Sheet 1

INVENTOR.
CHARLES G. ELLWANGER

BY

Richard W. Treverton

ATTORNEY

MACHINE FOR CUTTING RACK TEETH OR THE LIKE

Filed Feb. 11, 1963 4 Sheets-Sheet 2

MACHINE FOR CUTTING RACK TEETH OR THE LIKE

Filed Feb. 11, 1963 4 Sheets-Sheet 3

77
76
78
81
71
72
70
82
80
91
47
75
73
67
90
79
86
69
78
83
68
89
99
98

38
35
36
37
45
43
42
46
16
44
41
39
18

United States Patent Office 3,176,586

Patented Apr. 6, 1965

1

3,176,586

MACHINE FOR CUTTING RACK TEETH OR THE LIKE

Charles G. Ellwanger, Rochester, N.Y., assignor to The Gleason Works, Rochester, N.Y., a corporation of New York Filed Feb. 11, 1963, Ser. No. 257,611
11 Claims. (Cl. 90—9.6)

The present invention relates to a machine for cutting rack teeth and particularly to a gear cutting machine and an attachment therefor which adapts it for the cutting of such teeth.

A known machine for cutting straight bevel and spur gears is provided with a rotatable cradle supporting a pair of interlocking disc milling cutters, and a work head journaling a work spindle and movable in a path perpendicular to the cradle rotation axis. For generating bevel gears of usual design the work head locked against such motion and the cradle and the work spindle are simultaneously rotated. The cutters simulate a crown gear that is rolling in mesh with a work gear on the spindle, and thereby generate tooth surfaces on the work gear. For generating spur gears the cradle is locked against rotation and the work head is moved in said path perpendicular to the cradle axis in time with rotation of the work spindle, to cause the work gear to roll on the cutters as it would on the tooth of a stationary rack.

By the present invention the aforementioned motion of the work head may be utilized for traversing a workpiece past the cutters for the cutting of the teeth, and cradle rotation used for positioning the cutter axes at right angles to the path of such motion of the work head. The workpiece is mounted on a slide of the attachment which is moved in a stepwise manner relative to the work head, for the cutting of successive rack tooth surfaces. One increment of this stepwise or indexing motion is effected hydraulically upon relative withdrawal between the cutters and the workpiece which occurs upon the completion of each reciprocation of the work head.

A preferred embodiment of the invention is shown in the accompanying drawings, wherein.

Figure 1:
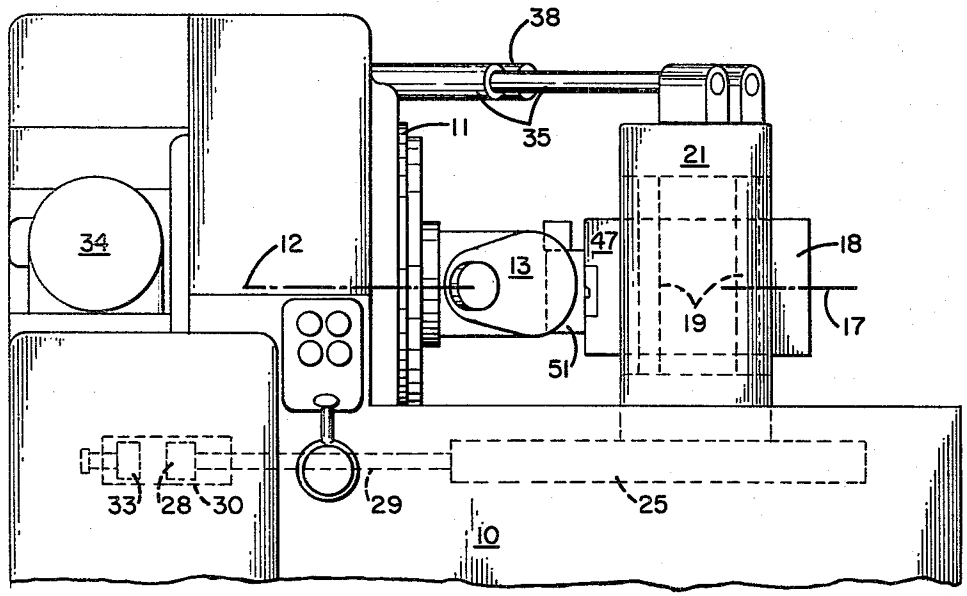
FIGS. 1 and 2 are respectively front and plan views of the machine.
Figure 2:
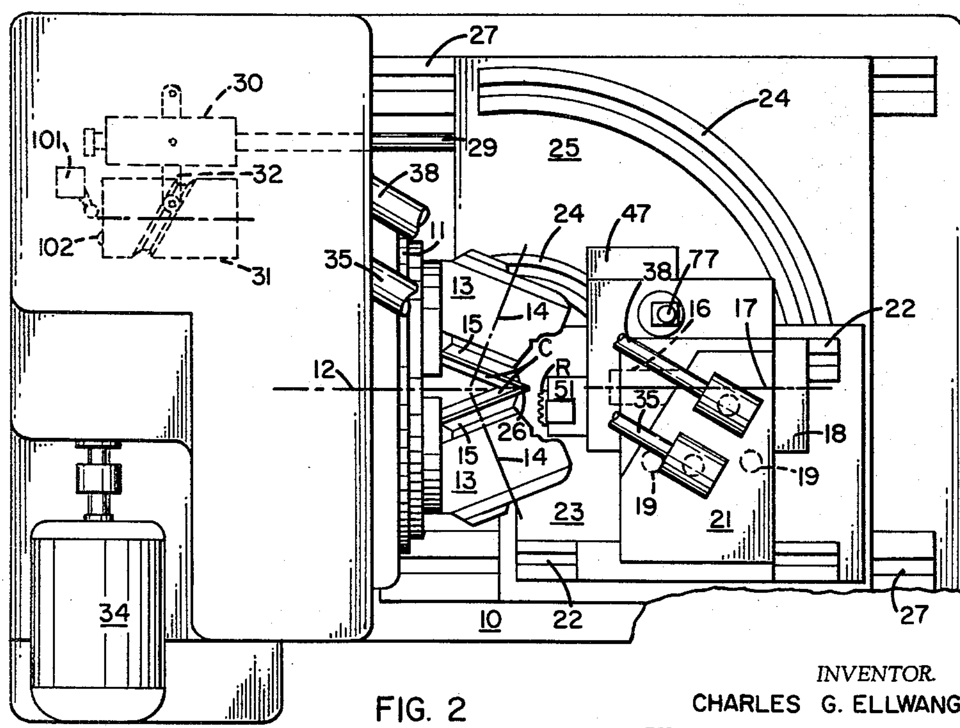

Referring to FIGS. 1 and 2, the machine comprises a frame 10 on which a cradle 11 is rotatable about axis 12. The cradle carries a pair of housings 13 each journaling for rotation about an axis 14 a spindle 15 supporting a milling cutter C. Each of these cutters, which are of the type known as interlocking disc cutters, has its blades arranged to enter the interblade spaces of the other, so that both cutters may operate at one time in the same tooth space of a workpiece. The cutter axes 14 are inclined to the plane of rotation of the cradle, and the housings 13 are adjustable on the cradle in order that the cutters for generating a bevel gear may represent a tooth of a crown gear whose axis is 12, or, for generating a spur gear, may represent a tooth of a rack.

A work spindle 16, on which a work gear is mounted in the case of bevel or spur gear generation, is rotatable about horizontal axis 17 in a work head 18 which is movable vertically, at right angles to axis 12, along guides

2

19 on a column 21. The latter is adjustable along ways 22, parallel to axis 17, on a swinging base 23 which is adjustable, along circular ways 24 on sliding base 25, about a vertical axis 26.

The sliding base is movable horizontally, parallel to axis 12, along ways 27 on frame 10. Such movement is effected by means of a feed cam and hydraulic cylinder arrangement substantially as disclosed in L. O. Carlsen Patent 2,775,921. By this arrangement a piston 28, connected to the sliding base 25 by a rod 29, is reciprocable in a cylinder 30 to move the base between work-loading and cutting positions; a feed cam 31 acting through a lever 32 effects advance and retraction of the cylinder-piston-slide assembly to respectively infeed the work into the cutters and withdraw it from them to permit tooth-to-tooth indexing of the work; and a piston 33, which acts as a stop for sliding base infeed motion of piston 28, is movable in the cylinder to provide a slight further infeed, for example between the rough cutting and the finish cutting of a gear.

Figure 7:
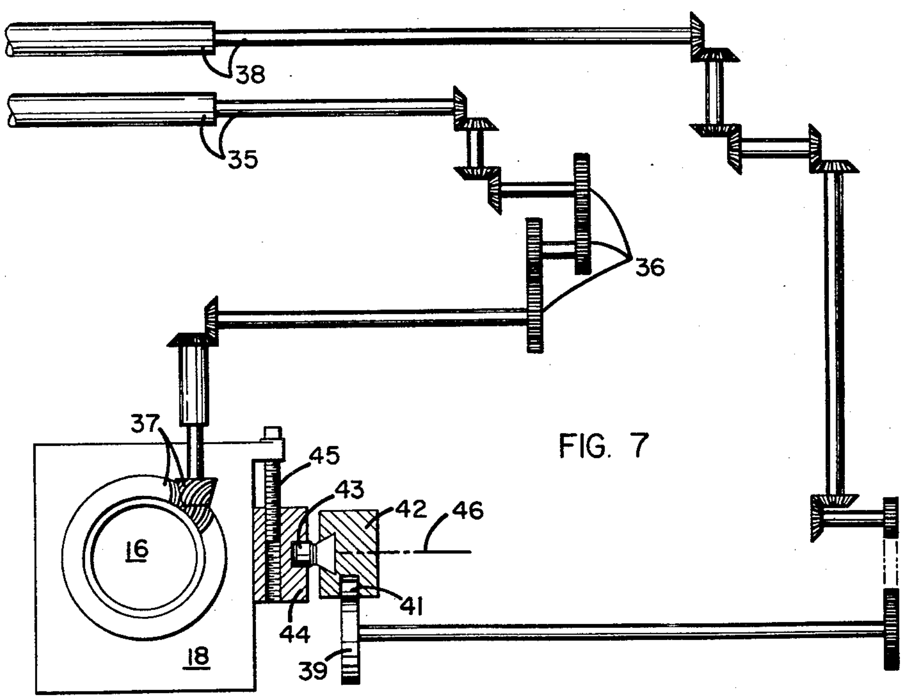
FIG. 7 is a partial drive diagram of the machine.

As in the machine of the aforementioned patent, the feed cam 31, which is driven by motor 34 through one revolution for each tooth cutting cycle, is adapted to effect alternate forward and reverse operation of a gear-and-shaft generating train which connects the cradle 11 and work spindle 16. An indexing mechanism connected to the train by differential gearing is arranged to effect the tooth-to-tooth indexing at the time during each cycle when the feed cam has withdrawn the work. The same motor 34 may drive the cutters C through a connected gear train. As shown in FIG. 7, the generating train, which includes overhead telescoping shaft 35, drives the work spindle 16 through index change gears 36 and hypoid reduction gears 37. The generating train further includes a second overhead telescoping shaft 38 connected to a cam 39 for reciprocating the work head vertically relative to column 21. As FIG. 7 shows schematically, the cam 39 acts against a roller 41 on a lever 42 which has another roller 43 engaged in a horizontal guide 44 secured to the work head 18. The guide is vertically adjustable on the work head by means of a screw 45; the lever 42 is fulcrumed to column 21 on an axis 46 which is spaced from rollers 41 and 43 in a direction perpendicular to the drawing plane; and roller 43 is adjustable on lever 42, also in said perpendicular direction, to vary the stroke of the work head reciprocation effected by the cam.

For the usual generation of bevel gears as described hereinbefore, the drive to cam 39 is disconnected and the work head 18 is clamped to column 21; while for generating spur gears the connection of the generating train to cradle 11 is disconnected and the cradle is clamped to the frame 10. For cutting racks by the present invention the cutter heads 13 are adjusted to bring both spindle axes 14 into a common plane parallel to axis 12. The cradle is disconnected from the generating train, is rotated about axis 12 to make axes 14 horizontal, i.e. perpendicular to guides 19, and is clamped in this position. The generating train drive to the work spindle 16 is preferably disconnected.

Figure 5:
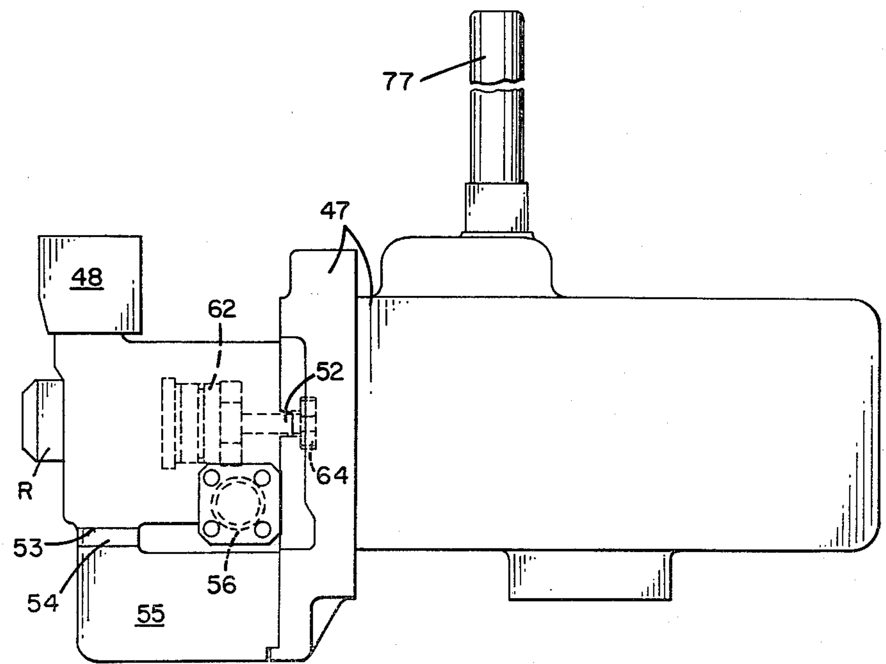

For supporting a workpiece R on which rack teeth are to be cut, a bracket 47, of approximately L-shape in plan, is rigidly secured to the work head 18, overlying but preferably out of contact with the protruding end of work spindle 16. By means of suitable hydraulically actuated chucking means 48, 49, the workpiece is clamped in work slide 51 which has a tongue 52, FIGS. 3 and 5, slidable in a horizontal guide groove in the bracket and a bearing face 53 in sliding contact with a plane way 54 on part 55 of the bracket. A stationary piston 56 secured to the bracket 47 by a rod 57 and connector 58 is provided in a cylinder in the slide. By application of hydraulic pressure to the cylinder chambers 59 and 61 on opposite sides of the piston the slide may be moved respectively to the left and right, in FIG. 3. During cutting, the slide is hydraulically clamped to the bracket 47 by means of a piston 62 arranged for very slight motion in cylinder 63 in the slide, the piston being connected by a rod to a clamp block 64 slidable in a T-slot 65 in the bracket.

Figure 3:
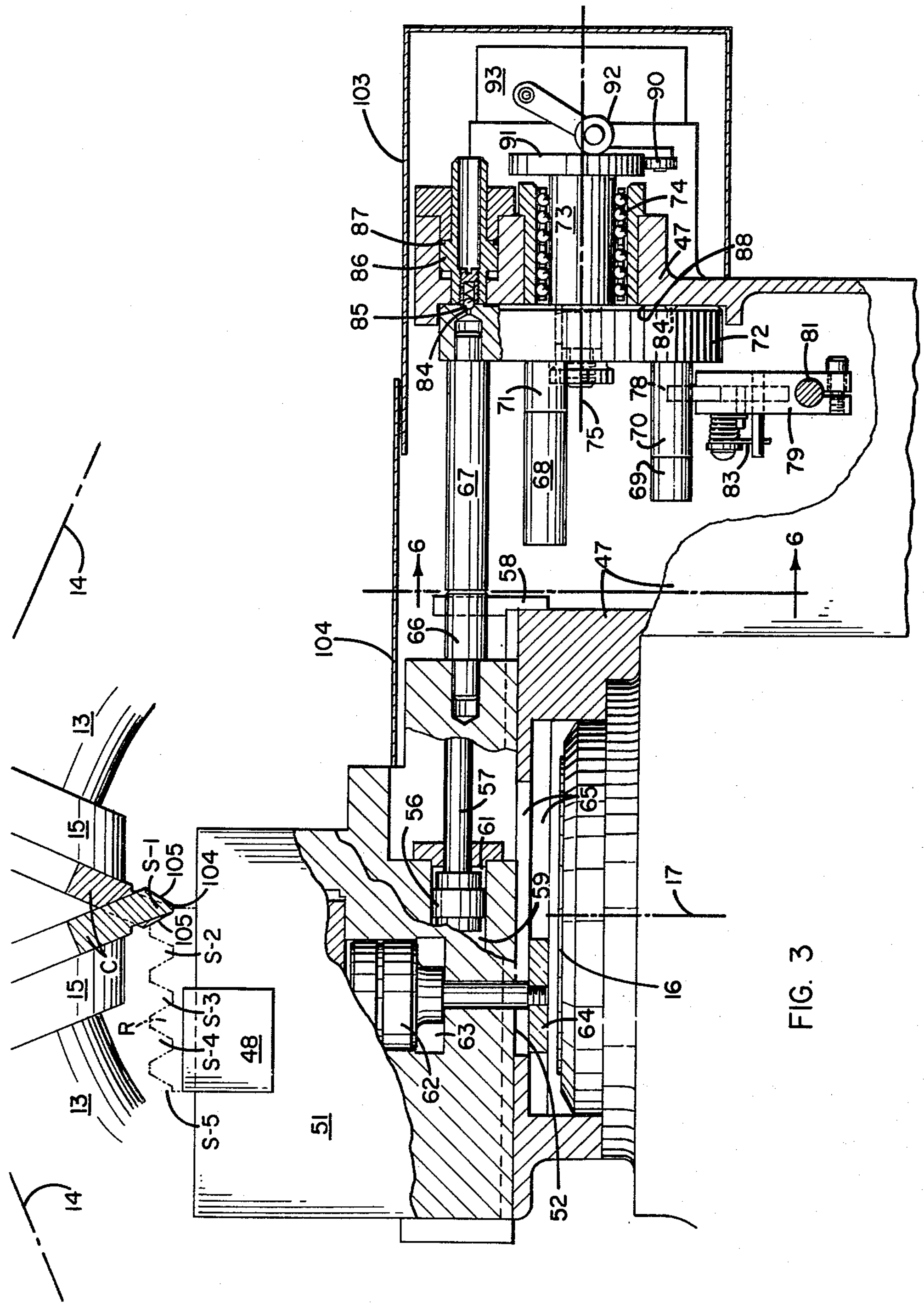
FIG. 3 is a fragmentary plan sectional view of the attachment mounted on the machine, the sectional portion of the view, which illustrates the work slide and indexing mechanism of the attachment, being approximately in the planes designated 3—3 in FIG. 4.
Figure 6:
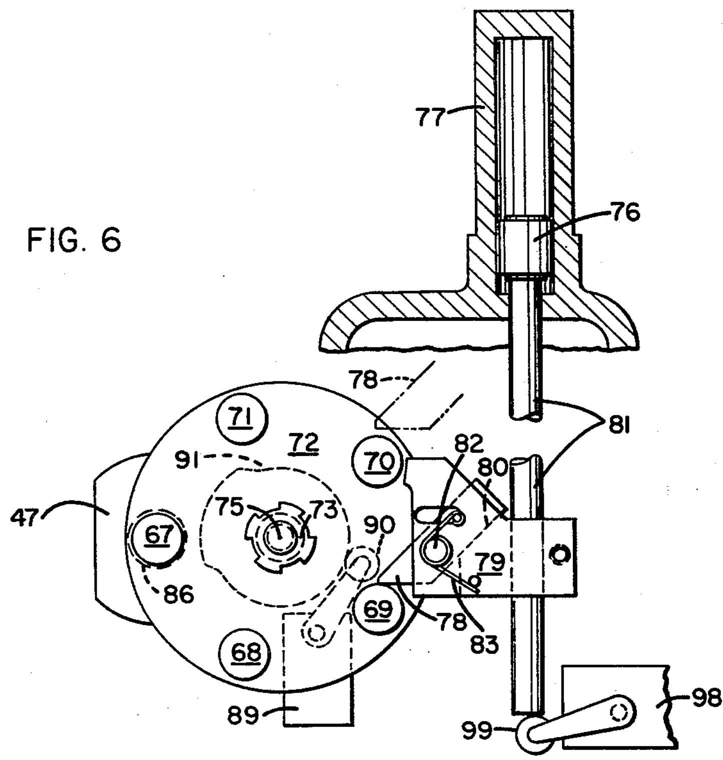
FIG. 6 is a detail sectional view in plane 6—6 of FIG. 3.

Movement of the slide 51 to the right in FIG. 3 is limited by abutment of a pin 66, secured to the slide, with one of five stop pins 67 to 71, of progressively decreasing length, which are mounted in a circle on a disc 72. In the position shown the pin 66 abuts the longest stop pin 67. The disc is secured to a shaft 73 which is supported in the bracket 47 on ball-sleeve bearing 74 for rotation and limited axial motion about and along axis 75 which extends in the same direction that the slide is movable. For effecting stepwise rotation of the disc to successively align its several stop pins with pin 66, the hydraulically actuated ratchet mechanism shown in FIGS. 3 and 6 is provided. This mechanism comprises piston 76 reciprocable in cylinder 77 on the bracket, and a pawl 78 carried by a plate 79 that is secured to the piston rod, 81. The pawl is pivoted to the plate by a pin 82 and is urged by a spring 83 toward its clockwise limit position about this pin, shown in FIG. 6, wherein it abuts surface 80 of the plate.

On its back face, the disc 72 has five indentations 84, each aligned with one of the pins 67–71 and adapted to receive a spring-backed ball detent 85, the latter being guidingly supported by a piston 86 reciprocable in a cylinder in bracket 47. The detent, by seating in one of the indentations 84, holds the disc against unintentional angular displacement in the exact position in which the related stop pin 67–71 is aligned with pin 66. By application of hydraulic pressure to chamber 87 back of piston 86 at a time when pin 66 is away from the stop pins, the disc and shaft 73 may be moved forwardly to free the back face of the disc from contact with the seating face 88 therefor on bracket 47, to permit easy rotation of the disc and shaft about axis 75.

Figure 4:
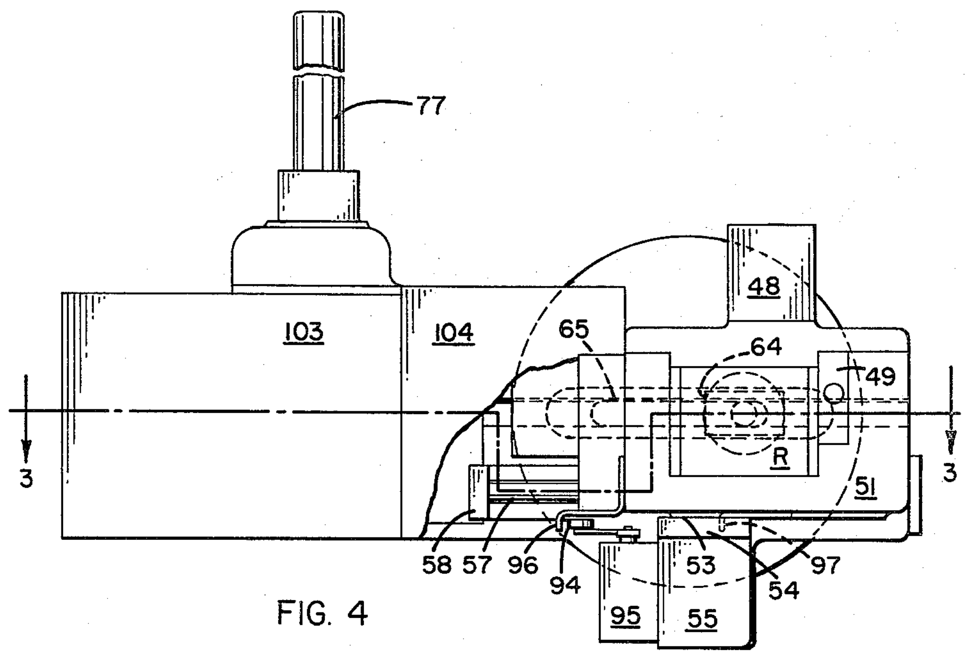
FIGS. 4 and 5 are respectively side and front views of the attachment.

A switch 89, FIG. 6, supported on bracket 47, has on the actuating arm thereof a roller 90 engaging the periphery of a cam 91 provided on shaft 73, while the plane back face of the cam engages a similar roller 92 of a switch 93, FIG. 3, also mounted on the bracket. The corresponding roller 94 of another switch, 95 in FIG. 4, mounted on part 55 of bracket 47, is adapted for contact by abutments 96 and 97 on slide 51. Still another switch, 98 in FIG. 6 is mounted on bracket 47 and has an actuating roller 99 abutted by rod 81 when piston 77 reaches its lower limit position. These switches, together with a switch 101, FIG. 2, actuated by a button 102 on feed cam 31, control solenoid valves (not shown) for effecting the operating sequence next to be described. The switches 89, 93 and 98 and other parts of the indexing mechanism for slide 51 are protected by a guard 103 secured to bracket 47 and a guard 104 secured to slide 51 and adapted to telescope over guard 103.

Prior to rack tooth cutting operation of the machine a workpiece R is chucked on the slide 51. The slide 51 is clamped by piston 62 in the position shown in FIG. 3. The sliding base 25 is advanced by piston 28 moving into abutment with piston 33, FIG. 1, the latter being in its left limit position. Operation of the machine by motor 34 is started, causing the cam 31 to infeed the sliding base 25 to thereby cause the rotating cutters to mill the lower portions of the first tooth space S–1 to roughing depth and to dwell at this depth. The particular cutters shown are adapted to cut with their tip edges 104 and side edges 105, the latter being inclined to the respective cutter axes 14 and hence describing conical cutting surfaces. During the dwell at roughing depth, the cam 39, FIG. 7, lifts the work head 18 along vertical guides 19, to traverse the workpiece past the rotating cutters, thereby completing the rough cutting of the first tooth space S–1. Feed cam 31 then slightly advances the sliding base to bring the workpiece to finishing depth relative to the cutters; the cam 39 effects the downward return motion of work head 18 during which the tooth space S–1 is finish cut; and the cam 31 then withdraws the sliding base to allow indexing of slide 51, to the right in FIG. 3, to permit cutting of the next tooth space S–2. This machine cycle is repeated for the cutting of each tooth space, S–1 to S–5, after which the machine is stopped and the sliding base is withdrawn by piston 28 to allow removal of the workpiece.

Upon the first withdrawal of the sliding base by feed cam 31, at the conclusion of cutting tooth space S–1, switch 101 is closed by button 102, to thereby actuate solenoid valves which, (*a*) release pressure to chamber 63, FIG. 3, thereby unclamping slide 51; (*b*) apply pressure to chamber 59 (and release it from chamber 61) to cause slide 51 to move to the left on piston 56, thereby withdrawing pin 66 from stop pin 67; (*c*) apply pressure to chamber 87 to move disc 72 slightly to the left, away from seat 88, and (*d*) apply pressure to the upper end of cylinder 77 to lower pawl 78 from its position shown in broken lines to that shown in full lines, to thereby advance the disc 72 by one-fifth of a turn, aligning stop pin 68 with pin 66. At the end of this stroke of piston 77, rod 81 closes switch 98, thereby (*e*), placing chamber 87 on exhaust and reversing the application of pressure to chambers 59 and 61, and so moving slide 51 to the right until pin 66 abuts stop pin 68 and moves disc 72 against face 88. Toward the end of this stroke the disc abuts the piston 86, and, due to restricted exhaust from chamber 87, reduces the force of impact against face 88. When the disc is against this face the workpiece is positioned for the cutting of tooth space S–2. As this position is reached the switch 93 is closed, causing (*f*) application of pressure to chamber 63 to clamp the slide to bracket 47; (*g*) reversal of pressure to cylinder 77 to raise the piston 76, returning the pawl 78 to its position shown in broken lines; (*h*) release of pressure from chamber 87 back of piston 86; and (*i*) enabling continuation of operation of the machine through another cutting cycle.

The indexing cycle described is repeated at the conclusion of each machine cutting cycle, thereby successively advancing slide 51 for the cutting of tooth spaces S–3 to S–5. Because progressively shorter stop pins are brought into alignment with pin 66, steps (*c*) and (*d*), above, can proceed as soon as step (*b*), movement of slide 51 to the left in FIG. 3, begins. However, after the last tooth space, S–5, is cut, the next angular advance of disc 72, to align longest pin 67 with pin 66, in preparation for cutting the first tooth space of a fresh workpiece, requires full advance of the slide before step (*d*) can occur. Accordingly, when the pin 66 abuts the shortest stop pin 71, in the limit position of slide 51 to the right in FIG. 3 (to the left in FIG. 4), abutment 97 opens switch 95 to disable operation of the solenoid valve which effects steps (*c*) and (*d*). When, upon the next succeeding step (*b*), the slide 51 is moved to its limit position to the left in FIG. 3 (to the right in FIG. 4) stop 96 recloses switch 95 so that steps (*c*) and (*d*) can occur.

In racks used in automobile steering gear it is sometimes desirable to cut the center tooth slot S–3 shallower than the others, to reduce steering backlash in the straight-ahead position. For this purpose the cam 91 is arranged to close switch 89 when stop pin 69 is aligned with pin 66, to cause the application of pressure to the left face of piston 33, thereby slightly withdrawing slides 25 for the cutting of slot S–3.

Referring to the stop member 67–72, the pins 67–71 thereof are rigidly but preferably detachably connected to the disc 72 thereof, in order to enable their replacement by pins of different lengths, such as may be required for cutting racks of different pitches. As will be apparent, by suitably varying the lengths of the pins the rack teeth may be made of either constant or varying pitch tooth spacing. By modifying the chucking means, to incline the face plane of the workpiece R to the vertical path of reciprocation of the work head 18, rack teeth of tapering depth may be cut.

Various other modifications may be made within the purview of the invention. For example the work holder 51 may be movable on curved instead of rectilinear guideways, or otherwise mounted on its support 47 for curvilinear instead of rectilinear reciprocation, as may be required for the cutting of curved racks or gear sectors. As another example, by connecting the rack-cutting attachment to the work head of a machine having a face mill cutter, instead of to one having interlocking disc cutters, racks with longitudinally curved teeth instead of straight teeth may be cut. In such cutting the work head may be clamped against vertical motion, the cutting being a plunge-milling operation effected by infeed of the sliding base of the machine.

Having now described the preferred embodiment of the invention and its operation, what is claimed is:

1. A gear machine having a frame on which a guide member is angularly adjustable, a work head reciprocable on the guide member in the direction of the axis about which the column is adjustable and means for effecting such reciprocation, a cradle housing on the frame supporting a cradle upon which a cutter spindle is rotatable, the cradle being adjustable about an axis inclined to the axis of the cutter spindle and perpendicular to the axis about which the column is adjustable, whereby the cutter spindle axis may be adjusted into perpendicularity to the direction of work head reciprocation, a sliding base which carries one of said cradle housing and said guide member and is reciprocable on the frame in the direction of said cradle adjustment axis, and means for effecting such reciprocation of the sliding base in time with the reciprocation of the work head, for relative infeed and withdrawal between work on the work head and a cutter on the cutter spindle, characterized by a mechanism to enable the cutting of racks comprising a bracket rigidly secured to the work head, a work slide adapted to support a workpiece of rack form and mounted for reciprocation on the bracket in a direction perpendicular to both the axis of angular adjustment of the work head and the cradle adjustment axis, and an indexing mechanism arranged to operate in time with said reciprocations for effecting stepwise advance of the work slide on the last-mentioned housing for the cutting of successive tooth surfaces of the workpiece upon successive reciprocations of the work head.

2. A machine having a frame supporting for rotation on intersecting axes a pair of spindles for cutters adapted to simultaneously cut opposite tooth sides of a rack, the frame also supporting a work holder, a sliding base mounted for reciprocation on the frame for effecting relative infeed and withdrawal between the cutter spindles and work holder in a direction parallel to a line which is coplanar with said axes and bisects the angle between them, a cutting-motion slide reciprocable on the frame for effecting relative cutting motion between the work holder and cutter spindles in a direction perpendicular to both of said intersecting axes, and an indexing slide for effecting stepwise advance between the work holder and cutter spindles in a direction perpendicular both to the direction of infeed and withdrawal and to the direction of reciprocation of the cutting motion slide, and actuating means for effecting said reciprocations of the sliding base and cutting-motion slide and said stepwise advance in such timed relation as to effect the cutting of successive tooth surfaces on a workpiece on the work holder on successive cutting reciprocations.

3. A gear machine having a frame, a work head angularly adjustable on the frame, a cradle housing supporting a cradle upon which a cutter spindle is rotatable, the cradle being adjustable about an axis perpendicular to the axis about which the work head is adjustable, a sliding base which carries one of said cradle housing and said work head and is reciprocable on the frame in the direction of said cradle adjustment axis, and means for effecting such reciprocation of the sliding base, characterized by a mechanism to enable the cutting of racks comprising a bracket rigidly secured to the work head, a work slide adapted to support a workpiece of rack form and mounted for reciprocation on the bracket in a direction perpendicular to both the axis of angular adjustment of the work head and the cradle adjustment axis, and an indexing mechanism arranged to operate in time with said reciprocation for effecting stepwise advance of the work slide on the last-mentioned housing for the cutting of successive tooth surfaces of the workpiece upon successive reciprocations of the sliding base.

4. A machine having a frame supporting tool means adapted to cut the tooth sides of a rack, the frame also supporting a work head on which there is mounted a work slide adapted to support a workpiece of rack form, a sliding base mounted for reciprocation on the frame for effecting relative infeed and withdrawal between the tool means and work head in a direction perpendicular to the direction motion of the slide on the work head and depthwise of teeth to be cut in the workpiece, means for effecting stepwise advance of the slide on the work head and actuating means for effecting said reciprocations of the sliding base and said stepwise advance in such timed relation as to effect the cutting of successive rack tooth surfaces on the workpiece, said means for effecting stepwise advance of the slide comprising a fluid pressure actuator for the slide, a stop member rotatable relative to the work head and having a plurality of stop surfaces for abutment by the slide to limit the forward stroke thereof, said stop surfaces being at progressively different levels for positioning the slide for the cutting of said successive tooth surfaces, a mechanism for effecting stepwise rotation of the top to bring said stop surfaces successively into position for abutment by said slide, a fluid pressure actuator for said mechanism, means operable upon completion of an indexing stroke of the latter actuator for effecting a forward stroke of the slide by its actuator, and means operable upon completion of such forward stroke of the slide for effecting resetting of said mechanism by its actuator.

5. A machine according to claim 4 in which said stop member is movable along its axis of rotation which extends in the direction of slide reciprocation, and said means for effecting resetting of said mechanism is operable by such movement of the stop member to its forward limit position by the slide.

6. A tooth cutting machine comprising a support and a work holder movable thereon, a fluid pressure actuator for the work holder, a stop member rotatable in the support and having a plurality of stop surfaces for abutment by the work holder to limit the forward motion thereof, said stop surfaces being at progressively different levels for positioning the work holder for the cutting of successive teeth of a workpiece thereon, a mechanism for effecting stepwise rotation of the stop to bring said stop surfaces successively into position for abutment by said work holder, a fluid pressure actuator for said mechanism, means operable upon completion of an indexing stroke of the latter actuator for effecting a forward motion of the work holder by its actuator, and means operable upon completion of such forward stroke of the work holder for effecting resetting of said mechanism by its actuator.

7. A machine according to claim 6 in which said stop member is movable along its axis of rotation, and said means for effecting resetting of said mechanism is operable by such movement of the stop member to its forward limit position by the work holder.

8. A machine according to claim 7 in which said work holder is a slide and the axis of said stop member extends in the direction of reciprocation of the said slide.

9. A tooth cutting machine comprising a support and a work holder movable on said support, a piston-cylinder device for reciprocating the work holder, a stop member for the work holder rotatable and reciprocable on the support about and along an axis extending substantially in the direction of motion of abutting part of the work holder, said stop member having a plurality of faces for abutment by said part and which are spaced from each other about said axis and also along said axis, the support having a seat for abutment by said stop when said device moves the work holder thereagainst, means for effecting step-by-step rotation of the stop about said axis in time with operation of the work holder, and a second piston-cylinder device for moving the stop member away from said seat and for checking motion of the stop member toward said seat.

10. A machine according to claim 9 in which said stop member has a plurality of indentations corresponding in number to said stop faces, and there is a detent carried by the piston of said second piston-cylinder device and engageable in said indentations for maintaining alignment of said stop faces with said abutting part of the work holder.

11. A machine having a frame supporting for rotation on intersecting axes a pair of interlocking disc cutters having convex conical cutting surfaces adapted to simultaneously cut opposite sides of a rack tooth slot, the frame also supporting a work holder, a sliding base mounted for reciprocation on the frame for effecting relative infeed and withdrawal between the cutters and work holder in a direction parallel to a line which is coplanar with said axes and at least approximately bisects the angle between them, a cutting-motion slide reciprocable on the frame for effecting relative cutting motion between the work holders and cutters in a direction perpendicular to both of said intersecting axes, and an indexing slide for effecting stepwise advance between the work holder and cutters in a direction perpendicular both to the direction of infeed and withdrawal and to the direction of reciprocation of the cutting motion slide, and actuating means for effecting said reciprocations of the sliding base and cutting-motion slide and said stepwise advance in such timed relation as to effect the cutting of successive tooth surfaces on a workpiece on the work holder.

References Cited by the Examiner

UNITED STATES PATENTS

| | | | |
|---|---|---|---|
| 1,001,008 | 8/11 | Fay | 90—9 |
| 1,978,359 | 10/34 | Archea | 90—9.6 |
| 2,292,892 | 8/42 | Marsilius | 90—15.1 |
| 2,775,921 | 1/57 | Carlsen | 90—3 |
| 2,870,688 | 1/59 | Bonnafe | 90—83 X |
| 2,953,975 | 9/60 | Hoglund | 90—15.1 X |

References Cited by the Applicant

UNITED STATES PATENTS

| | | |
|---|---|---|
| 1,097,222 | 5/14 | Grannis. |
| 2,567,273 | 9/51 | Carlsen. |
| 2,824,498 | 2/58 | Baxter et al. |

FOREIGN PATENTS

| | | |
|---|---|---|
| 923,481 | 4/63 | Great Britain. |

WILLIAM W. DYER, Jr., *Primary Examiner.*